Patented Aug. 13, 1940

2,211,693

UNITED STATES PATENT OFFICE 2,211,693

PREPARATION OF GLYCOLIC ACID ESTERS

Franklin T. Flaherty, Swarthmore, Pa., assignor to E. I. du Pont de Nemours & Company, Wilmington, Del., a corporation of Delaware No Drawing. Application April 27, 1939,
Serial No. 270,424

15 Claims. (Cl. 260—484)

This invention relates to a process for the preparation of alkyl glycolates and, more particularly, to the preparation of these esters from formaldehyde and alkyl formates.

Glycolic acid esters, otherwise known as esters of hydroxy acetic acid and esters of ethanolic acid, having the formula, $CH_2OHCOOR$, have been usually prepared by esterification of glycolic acid with an alcohol. Prior to the esterification step, however, the acid itself must be prepared and various methods for its preparation have been proposed such, for example, as the oxidation of ethylene glycol to glycolic aldehyde, followed by the subsequent oxidation of glycolic aldehyde to glycolic acid. Due in large measure to the high cost of the basic materials required for the manufacture of the acid and the additional cost of esterification of that acid, alkyl glycolates have had but limited commercial use.

Object of the present invention is to provide an improved process for the preparation of glycolic acid esters. Another object is to provide an economical process for the preparation of glycolic acid esters from inexpensive raw materials. Yet another and more specific object is to provide a process wherein formaldehyde is interacted with an alkyl formate in the presence of an acidic type catalyst to obtain directly an alkyl ester of glycolic acid. A further object is to provide catalysts and conditions for the process. Other objects and advantages of the invention will hereinafter appear.

The above and other objects of the invention are realized by reacting formaldehyde, or one of its polymers, preferably in the presence of a catalyst having acidic characteristics, with a formic acid ester whereupon an ester of glycolic acid is directly obtained in accord with the equation:

$$HCHO + HCOOR \rightarrow CH_2(OH)COOR$$

in which R is an alkyl or aryl radical such as methyl, ethyl, normal and isopropyl, normal and isobutyl, amyl, benzyl and higher alkyl and aryl radicals.

The formaldehyde may be subjected to the reaction in any convenient way or any convenient form. Thus, gaseous formaldehyde may be used or polymeric forms of formaldehyde such, for example, as paraformaldehyde or trioxymethylene, either in the anhydrous form or dissolved in water.

I have found that compounds of an acidic nature are particularly well adapted for catalyzing the reaction and, for this purpose, inorganic and organic acid catalysts may be employed such, for example, as glycolic acid, formic acid, acetic acid, hydrochloric acid, sulfuric acid, phosphoric acid and like acidic-type catalysts. Boron fluoride, which is also an acidic-type catalyst, either in its anhydrous or hydrated form, is likewise suitable for accelerating the reaction.

These catalysts may be used in amounts ranging from 0.1 to 1.5 mols thereof per mol of the formaldehyde. Higher proportions, however, may be used in many instances such, for example, as in processes in which boron trifluoride or hydrochloric acid are employed as the catalyst, wherein they may be used in amounts up to and even greater than 1.5 mols per mol of formaldehyde. Due to the difficulties encountered in separating the glycolic acid ester from a reaction product containing relatively large amounts of boron fluoride, it is preferable to employ from 0.25 to 1.25 mols of this catalyst per mole of the alkyl formate. It will be found that with increased catalyst amount the reaction will proceed at a lower temperature and/or pressure, while with decreased catalyst amount a somewhat higher temperature and/or pressure is required to effect the reaction at an equal rate.

For the preparation of glycolic acid esters a quantity of water may be present equal to 1.0 mol of water per mol of the formaldehyde present. While concentrations of water higher than 1.0 mol per mole of formaldehyde may be present, higher concentrations, say, 10 or more mols per mol of formaldehyde are not used advisably, for they tend to lower the concentration of the product with resultant greater difficulty in subsequent concentration thereof. Where boron trifluoride is used as the catalyst, the molal ratio of water to boron trifluoride may be between 0.1 and 3 mols of water per mol of the boron trifluoride, although the reaction will occur in the absence of water.

The alkyl formate should, for optimum conversion of the formaldehyde used, be present in a molal excess, say, from 1.25 to 4 mols of ester per mole of aldehyde, although the glycolic ester is obtainable if the ratio of ester to aldehyde is as low as 0.25.

The reaction proceeds at ordinary pressures, although it is advantageous, with low catalyst concentrations, to use pressures in excess of atmospheric, say, from 5 to 1500 atmospheres or more. The reaction may be effected over a wide range of temperatures, although the optimum temperature varies with specific conditions depending inter alia upon the relative concentrations of catalyst, formic acid ester and formaldehyde present. Generally, the reaction can be carried out at temperatures ranging from 30 to 175° C., although temperatures between 50 and 150° C. have been found preferable.

The reaction occurs in liquid, vapor or two-phase systems. For the vapor or two-phase systems, in addition to the acid catalyst a contact substance, such as porous porcelain, pumice, or charcoal is used, the vaporized reactants and catalyst being passed at the desired temperature and pressure over the contact mass.

The glycolic acid ester may be separated from the reaction product after first removing the acid catalyst, either by neutralization, or, if boron trifluoride is used, by reaction between the boron trifluoride and a metal fluoride as disclosed in the U. S. patent of R. F. Schultz, Serial No. 2,135,458. The ester can then be separated from the product by distillation. The lower glycolic esters, particularly methyl and ethyl glycolate, are very easily decomposed during distillation in the presence of water and/or traces of mineral acid, and it is usually advisable, for optimum recovery, to convert these lower esters into less water soluble and more stable esters, such as the isobutyl derivative prior to removal from the reaction mixture. This may be accomplished by adding isobutanol to the reaction mixture and distilling the isobutyl glycolate formed therefrom after the ester interchange reaction has occurred.

The following examples will illustrate methods of practicing the invention, although it will be understood that the invention is not limited to the details therein given. The percentage yields given are calculated on the formaldehyde used and parts are by weight unless otherwise stated.

*Example 1.*—A charge composed of one mol of paraformaldehyde (30 parts), 1 mol of methyl formate (60 parts), two mols of glacial acetic acid (120 parts) and one mol of anhydrous boron trifluoride catalyst (68 parts) was processed for one hour at 150° C. in a copper-lined shaker tube. The reaction product was distilled with a large excess of methanol (5 to 6 times the amount required to convert the formaldehyde to methylal and the acetic acid to the methyl ester) and an aliquot part of the distillate analyzed for ester content. The remainder of the distillate was distilled from an excess of sodium hydroxide solution and the distillate hydrolyzed and then analyzed iodometrically for formaldehyde. The residue from the distillation with methanol was hydrolyzed by refluxing for one hour with water containing about 3% $H_2SO_4$ and distilled with isobutanol (a large excess, 5 to 6 times the necessary amount) until all the water was removed. The esterified material was washed with sodium fluoride solution to remove the $BF_3$ catalyst, then with 200 cc. of a strong $K_2CO_3$ solution and finally with 100 cc. of a saturated $Na_2SO_4$ solution. Distillation under reduced pressure (60–70 mm.) removed the isobutanol and entrained water and finally the isobutyl glycolate which boiled at 107°–110° at this pressure. A 64% yield of isobutyl glycolate was obtained based on the weight of formaldehyde consumed.

*Example 2.*—A mixture containing 120 parts of methyl formate, 30 parts of paraformaldehyde, and 35 parts of $(H_2O)_2BF_3$ was heated at 110° for 3 hours in a closed reaction vessel. The pressure rose to 12 atmospheres. The product was diluted with 100 parts of benzene, and 50 parts of sodium fluoride was added. The resulting mixture was vigorously shaken, and a pasty aqueous layer containing sodium fluoborate separated. This aqueous layer was separated by extraction with 50 parts of a mixture containing equal parts of methyl formate and benzene, and the extract was added to non-aqueous layer. The non-aqueous layer was then distilled in the presence of 2 parts of sodium fluoride, which left the last traces of boron fluoride as the residue. The condensate yielded 8.5 parts of methyl glycolate, boiling at 148–150°. The product was identified by conversion to hydroxyacetamide when treated with ammonia.

*Example 3.*—A mixture containing 76 parts of n-butyl formate, 25 parts of boron fluoride, and 11.1 parts of paraformaldehyde was heated at atmospheric pressure and 100° C. for 1 hour under a reflux condenser. The product was neutralized with concentrated potassium carbonate solution, and distilled. 12.3 parts of butyl glycolate, B. P. 100–115°, 85 mm. was obtained.

*Example 4.*—A contact catalyst consisting of 25 cc. crushed porcelain ("porous plate"), 8–14 mesh, was heated in a pyrex glass tube. The outer wall of the tube had a temperature of 130°, while the temperature within the porcelain bed ranged from 84° to 104°. Through this tube was passed, in the vapor phase and at atmospheric pressure, a mixture containing 15 parts of paraformaldehyde, 30 parts of methyl formate, and 64 parts of $HCOOCH_3.BF_3$. The condensed product was distilled with added methanol (200 parts), for the purpose of removing unreacted formaldehyde as methylal, and 18.7 parts of methylal was withdrawn. The residue was then steam-distilled for removal of methanol and hydrolysis of glycolic ester to glycolic acid. The aqueous solution of glycolic acid and $BF_3$ thus obtained was esterified with isobutanol in the manner described in Example 1, and 5.8 parts of isobutyl glycolate was isolated.

*Example 5.*—A mixture containing 22.2 parts of methyl formate and 47.5 parts of a complex containing equimolal proportions of methyl formate and $BF_3$ was heated at 70° and at atmospheric pressure in a flask equipped with a reflux condenser. Through the top of the reflux condenser 11.1 parts of paraformaldehyde was introduced into the reaction mixture. After the paraformaldehyde had been added, the reaction mixture was held at heat for 0.25 hour. The product was esterified at diminished pressure with isobutanol containing 5% water, the esterification product neutralized with potassium carbonate, and distilled. It yielded 14.9 parts of isobutyl glycolate.

*Example 6.*—A mixture containing 45 parts of paraformaldehyde, 180 parts of methyl formate, and 14 parts of sulfuric acid was heated for 1 hour at 150°, during which the pressure rose to 25 atmospheres. The product was distilled with 200 parts of methanol for removal of unreacted formaldehyde as methylal. The residue was neutralized with isobutanol and 21.6 parts of isobutyl glycolate was distilled from the neutralized residue.

The process of the invention may be effected in a continuous manner as is illustrated by the process of Example 4. The formaldehyde and ester, together with the catalyst are passed through reaction zone maintained at the desired temperature and pressure, the rates of flow being adjusted to yield the desired degree of the reaction. The unconverted reactants, after being separated from the product being recirculated after the addition of the proper amounts of ester and formaldehyde.

While the process has been described with particular reference to the use of formaldehyde, the formals such, for example, as dimethyl ether, methyl ethyl ether, diethyl ether, ethyl propyl ether and dipropyl ethers of methylene glycols, etc. may likewise be used with or without formaldehyde. When used, however, temperatures ranging between 125-200° C. should preferably be used.

Because of the corrosive nature of the catalyst and reactants it is advisable to conduct the process of the present invention in glass, silica, porcelain-lined or glass-lined vessels, or the inner surfaces of the reaction vessel which contact with the reactants should be constructed of such corrosion-resistant metals as silver, chromium, stainless steel, and the like.

When formaldehyde is referred to in the appended claims it will be understood that paraformaldehyde, formalin, trioxymethylene, or other polymeric or monomeric form of the formaldehyde, as well as formaldehyde, are also included.

From a consideration of the above specification, it will be appreciated that many changes may be made in the details therein given without departing from the scope of the invention or sacrificing any of the advantages that may be derived therefrom.

I claim:

1. A process for the preparation of glycolic acid derivatives which comprises reacting an alkyl formate with formaldehyde.

2. A process for the preparation of glycolic acid derivatives which comprises reacting an alkyl formate with formaldehyde in the presence of an acidic type catalyst.

3. A process for the preparation of glycolic acid esters which comprises effecting a reaction between an alkyl formate and formaldehyde, in accord with the equation:

$$HCHO + HCOOR \rightarrow CH_2(OH)COOR$$

in which R is a radical selected from the group consisting of methyl, ethyl, normal and isopropyl, normal and isobutyl, amyl and benzyl radicals.

4. The process of claim 3 conducted in the presence of an acidic-type catalyst.

5. The process of claim 3 conducted in the presence of boron trifluoride as the catalyst.

6. The process of claim 3 conducted at a temperature between 30° and 175° C. and a pressure between 5 and 1500 atmospheres.

7. A process for the preparation of a lower alkyl ester of glycolic acid which comprises reacting a lower alkyl ester of formic acid with formaldehyde at a temperature between 30° and 175° C., a pressure between 5 and 1500 atmospheres and in the presence of an acidic-type catalyst.

8. A process for the preparation of methyl glycolate which comprises reacting formaldehyde and methyl formate using boron trifluoride as the catalyst.

9. A process for the preparation of ethyl glycolate which comprises reacting ethyl formate and formaldehyde using boron trifluoride as the catalyst.

10. A process for the preparation of propyl glycolate which comprises reacting propyl formate and formaldehyde using boron trifluoride as the catalyst.

11. A process for the preparation of glycolic acid derivatives which comprises reacting an alkyl formate with a compound selected from the group consisting of formaldehyde and the formals.

12. A process for the preparation of methyl glycolate which comprises interacting formaldehyde and methyl formate with boron trifluoride as the catalyst, these constituents being present in a substantially equimolecular ratio.

13. A process for the preparation of isobutyl glycolate which comprises reacting formaldehyde with methyl formate using boron fluoride as the catalyst, adding methanol to the reaction product, removing the resulting formal formed by distillation, subsequently adding isobutanol to the formaldehyde-free reaction product to form isobutyl glycolate and separating the isobutyl glycolate from the esterified product.

14. A process for the preparation of isobutyl glycolate which comprises reacting 1 mol of formaldehyde and 1 mol of methyl formate in 2 mols of glacial acetic acid containing 1 mol anhydrous boron trifluoride, at a temperature of approximately 150° C., distilling the reaction product in a large excess of methanol to convert the formaldehyde to methylal, removing the methylal by distillation, and subsequently distilling the residue in the presence of isobutanol to recover the glycolic acid ester, as isobutyl glycolate.

15. A process for the preparation of alkyl glycolates which comprises reacting in the vapor phase formaldehyde and an alkyl formate with a volatile acid catalyst at a temperature between 50 and 150° C. and at a pressure between 5 and 1500 atmospheres.

FRANKLIN T. FLAHERTY.